(12) United States Patent
Mikami et al.

(10) Patent No.: US 12,333,785 B2
(45) Date of Patent: Jun. 17, 2025

(54) LEARNING DATA GENERATION DEVICE, LEARNING DATA GENERATION METHOD, AND PROGRAM

(71) Applicant: NIPPON TELEGRAPH AND TELEPHONE CORPORATION, Tokyo (JP)

(72) Inventors: Dan Mikami, Tokyo (JP); Mariko Isogawa, Tokyo (JP); Hiroko Yabushita, Tokyo (JP); Yoshinori Kusachi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 797 days.

(21) Appl. No.: 17/620,608

(22) PCT Filed: Jun. 24, 2019

(86) PCT No.: PCT/JP2019/024878
§ 371 (c)(1),
(2) Date: Dec. 17, 2021

(87) PCT Pub. No.: WO2020/261316
PCT Pub. Date: Dec. 30, 2020

(65) Prior Publication Data
US 2022/0375203 A1 Nov. 24, 2022

(51) Int. Cl.
*G06K 9/62* (2022.01)
*G06N 5/04* (2023.01)
(Continued)

(52) U.S. Cl.
CPC ........... *G06V 10/774* (2022.01); *G06N 5/041* (2013.01); *G06N 20/00* (2019.01); *G06T 7/00* (2013.01);
(Continued)

(58) Field of Classification Search
None
See application file for complete search history.

(56) References Cited

U.S. PATENT DOCUMENTS 10,118,696 B1 * 11/2018 Hoffberg ............... B64C 39/001
11,230,375 B1 * 1/2022 Hoffberg ................ B64C 21/00
(Continued)

FOREIGN PATENT DOCUMENTS

| CN | 109087336 A | * | 12/2018 | ............. G06T 7/246 |
| CN | 110458281 A | * | 11/2019 | ............. A63B 67/04 |

(Continued)

OTHER PUBLICATIONS

CN 109087336 A (machine translation) (Year: 2018).*
(Continued)

*Primary Examiner* — Feng Niu

(57) ABSTRACT

A learning data generation device for generating learning data for learning a recognizer capable of estimating a contour of a sphere making spinning motion, with high accuracy, the sphere being recorded in a single camera video image, is provided. The learning data generation device includes: a spinning rate estimation unit that receives an input of a learning video image in which motion of a spinning sphere is recorded and an initial value of a size of a contour of the recorded sphere in the video image, sets a plurality of set values of the size of the contour based on the initial value, and obtains an estimated value of a spinning rate of the sphere based on the learning video image, for each of the set values; a contour determination unit that receives an input of a true value of the spinning rate of the sphere, the true value being obtained in advance for the learning video image, and determines at least any of a plurality of the set values respectively corresponding to a plurality of the estimated values selected in order of closeness to the true value, as a determined value of the contour;

(Continued)

and a learning data output unit that outputs the learning video image and the determined value as learning data.

11 Claims, 19 Drawing Sheets

(51) Int. Cl.
*G06N 20/00* (2019.01)
*G06T 7/00* (2017.01)
*G06T 7/20* (2017.01)
*G06V 10/75* (2022.01)
*G06V 10/774* (2022.01)
*G06V 20/40* (2022.01)

(52) U.S. Cl.
CPC .............. *G06T 7/20* (2013.01); *G06V 10/757* (2022.01); *G06V 20/42* (2022.01); *G06V 20/46* (2022.01)

(56) References Cited

U.S. PATENT DOCUMENTS

| | | | |
|---|---|---|---|
| 11,712,637 B1 * | 8/2023 | Hoffberg | F42B 10/64 |
| | | | 701/2 |
| 12,118,672 B1 * | 10/2024 | Reinsel | G06F 16/287 |
| 2021/0008417 A1 * | 1/2021 | Tuxen | A63B 43/06 |

FOREIGN PATENT DOCUMENTS

| | | | |
|---|---|---|---|
| JP | 2002202317 A | * | 7/2002 |
| JP | 2014182032 A | * | 9/2014 |

OTHER PUBLICATIONS

CN 110458281 A (machine translation) (Year: 2019).*
JP 2014182032 A (machine translation) (Year: 2014).*
JP 2002202317 A (machine translation) (Year: 2002).*
He et al. (2017) "Mask R-CNN", IEEE International Conference on Computer Vision (ICCV).

* cited by examiner

DISTRIBUTION OF LIKELIHOOD IN CASE WHERE
DESIGNATION OF CORRESPONDING POINTS EASY

DISTRIBUTION OF LIKELIHOOD IN CASE WHERE
DESIGNATION OF CORRESPONDING POINTS DIFFICULT

LEARNING DATA GENERATION DEVICE, LEARNING DATA GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/024878, filed on 24 Jun. 2019, the disclosure of which is hereby incorporated herein by reference in its entirety.

TECHNICAL FIELD

The present invention relates to a learning data generation device, a learning data generation method and a program for generating learning data for learning a recognizer that estimates a contour of a sphere making spinning motion, the sphere being recorded in a single camera video image.

BACKGROUND ART

As a conventional method for implementing object detection or segmentation, Non-Patent Literature 1 is known. Mask R-CNN of Non-Patent Literature 1 has a function that extracts, for example, a region (contour) of a spinning sphere stored in a video image (for example, a ball used in a sport).

CITATION LIST

Non-Patent Literature

Non-Patent Literature 1: Kaiming He, Georgia Gkioxari, Piotr Dollar, and Ross Girshick, "Mask R-CNN", IEEE International Conference on Computer Vision (ICCV), 2017.

SUMMARY OF THE INVENTION

Technical Problem

However, a contour of a sphere that is moving while spinning at high speed (for example, a ball) is not clear because of an effect of, e.g., motion blur and where the sphere starts and ends is often unclear, and thus, accuracy of segmentation of an object region using a general tool may be insufficient.

Therefore, an object of the present invention is to provide a learning data generation device for generating learning data for learning a recognizer capable of estimating a contour of a sphere making spinning motion, with high accuracy, the sphere being recorded in a single camera video image.

Means for Solving the Problem

A learning data generation device of the present invention includes a spinning rate estimation unit, a contour determination unit and a learning data output unit.

The spinning rate estimation unit receives an input of a learning video image in which motion of a spinning sphere is recorded and an initial value of a size of a contour of the recorded sphere in the video image, sets a plurality of set values of the size of the contour based on the initial value, and obtains an estimated value of a spinning rate of the sphere based on the learning video image, for each of the set values. The contour determination unit receives an input of a true value of the spinning rate of the sphere, the true value being obtained in advance for the learning video image, and determines at least any of a plurality of the set values respectively corresponding to a plurality of the estimated values selected in order of closeness to the true value, as a determined value of the contour. The learning data output unit outputs the learning video image and the determined value as learning data.

Effects of the Invention

A learning data generation device of the present invention enables generating learning data for learning a recognizer capable of estimating a contour of a sphere making spinning motion, with high accuracy, the sphere being recorded in a single camera video image.

DESCRIPTION OF EMBODIMENT

Figure 1:
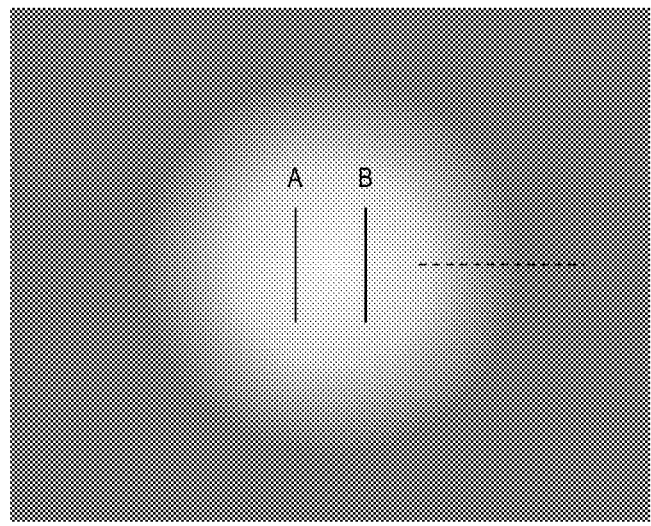
FIG. 1 is a diagram illustrating an example in which a contour of a spinning sphere recorded in a video image is unclear.

An embodiment of the present invention will be described in detail below. Note that component units having a same function are provided with a same reference numeral and overlapping description thereof will be omitted.

A "sphere recorded in a video image" in the below description is typically, but not limited to, a ball used in a ball sport. The present invention can be used not only for balls used in ball sports but also for arbitrary spheres that make spinning motion in general.

A method for estimating a contour and a spinning rate of a spinning sphere recorded in a video image will be described below. This method has a characteristic that if a smaller contour is defined in a video image, a larger spinning rate is estimated, and if a larger contour is defined in the same video image, a smaller spinning rate is estimated.

This characteristic will be described with reference to FIGS. 1 and 2. FIG. 1 illustrates a taken video image (formed by superimposition of two frames) in which a ball is present at a center part and a contour of the ball blurs, and thus, it is difficult to correctly determine where the contour ends. It is assumed that: this ball spins to the right of the figure; and a predetermined part of a pattern of the ball has moved from position A to position B between the two frames.

Figure 2:
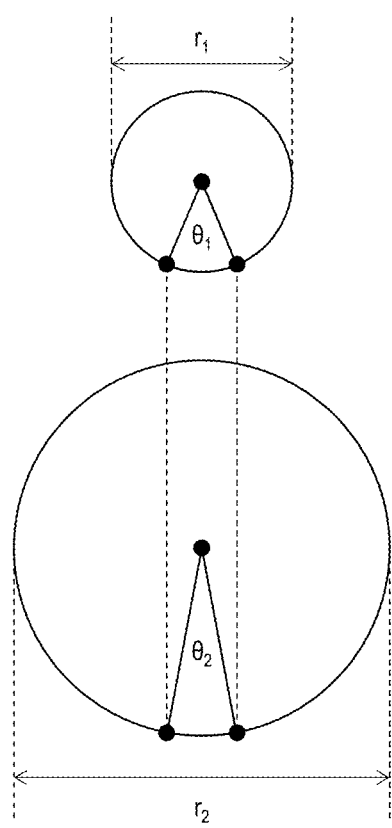
FIG. 2 is a schematic diagram illustrating a relationship between a size of the contour and an estimated spinning rate.

FIG. 2 illustrates the ball as viewed from a direction perpendicular to the direction of the spin. For example, where a contour $r_1$ is tentatively defined for the ball, the movement from A to B corresponds to a spin amount of $\theta_1$ and where a contour $r_2$ meeting $r_2 > r_1$ is tentatively defined for the ball, the movement from A to B corresponds to a spin amount of $\theta_2$. In this case, a relationship of $\theta_2 < \theta_1$ is clear.

Figure 3:
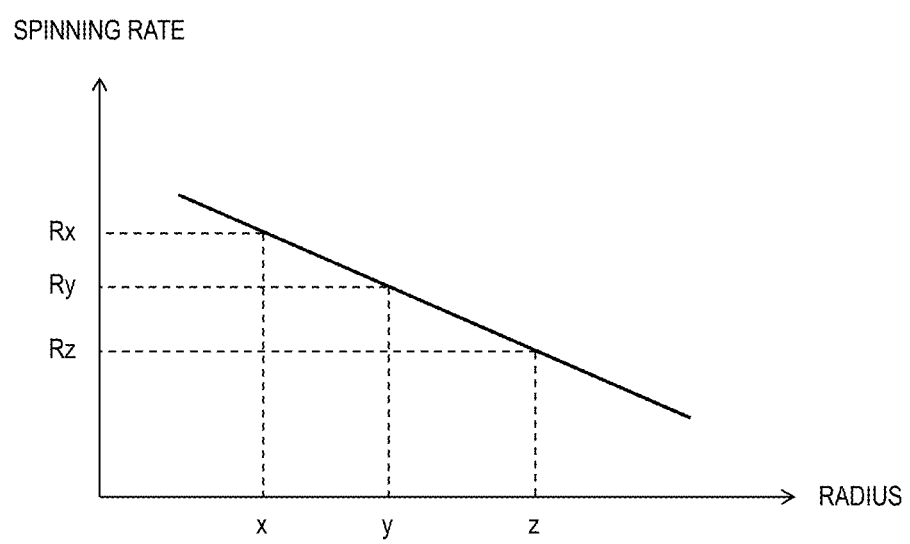
FIG. 3 is a graph illustrating a relationship between the size of the contour and the estimated spinning rate.
Figure 4:
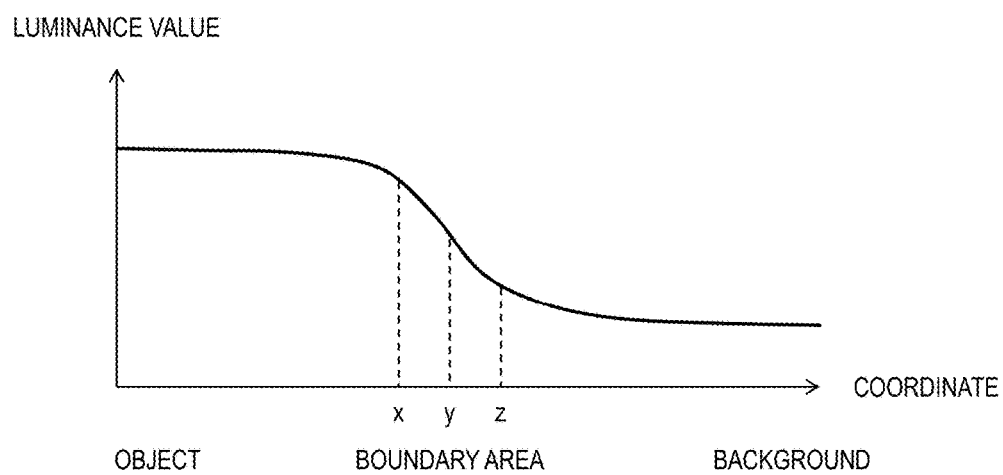
FIG. 4 is a graph illustrating luminance value changes in the sphere, a background and a boundary area therebetween.

This relationship is illustrated in FIGS. 3 and 4. FIG. 4 is a graph illustrating a luminance at each coordinate on the dashed line in FIG. 1, and the left side of the coordinate axis corresponds to a region of the ball and the right side of the coordinate axis corresponds to a region of a background. An area around a center of the coordinate axis is a boundary area that is not clear as to whether the area is included in the region of the ball or the region of the background. As stated above, if coordinate x in the boundary area is set as a boundary, spinning rate Rx is obtained, if coordinate y (>x) is set as a boundary, spinning rate Ry (<Rx) is obtained, and if coordinate z (>y) is set as a boundary, spinning rate Rz (<Ry) is obtained (FIG. 3).

Embodiment 1

[Learning Data Generation Device 11]

Figure 5:
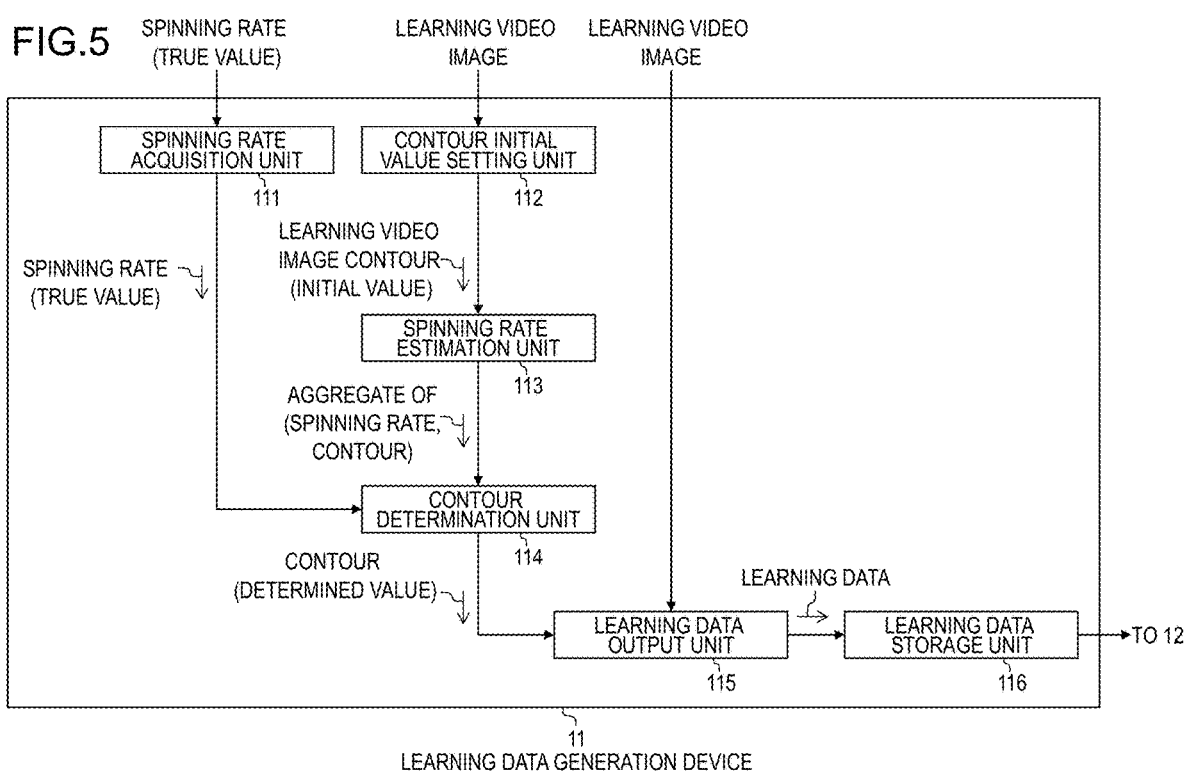
FIG. 5 is a block diagram illustrating a configuration of a learning data generation device of Embodiment 1.
Figure 6:
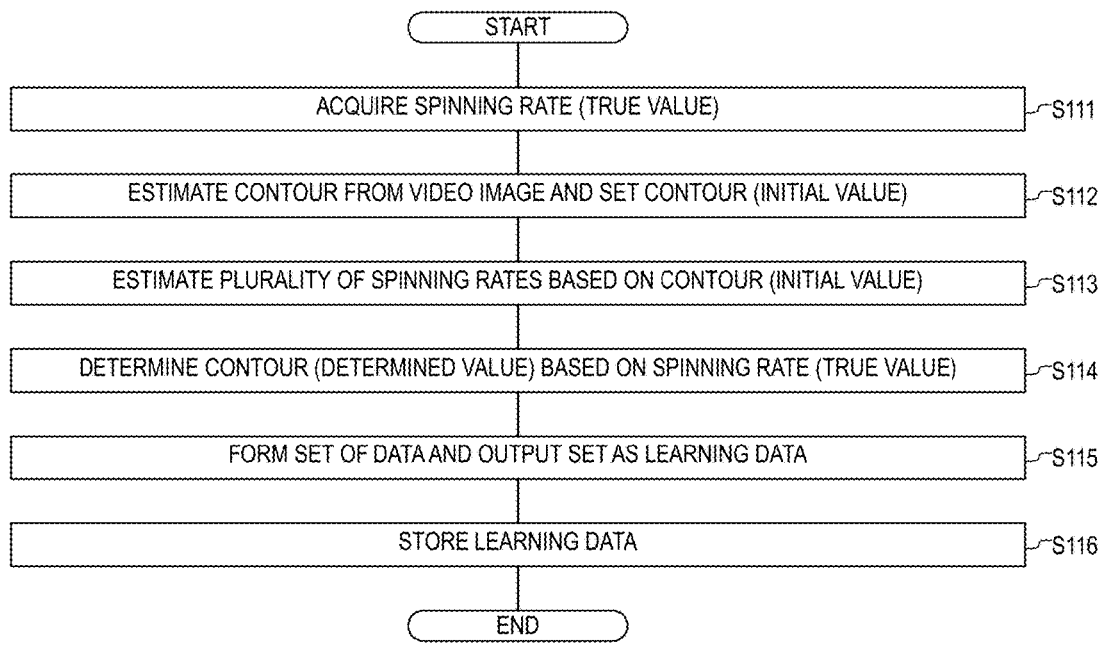
FIG. 6 is a flowchart illustrating an operation of the learning data generation device of Embodiment 1.

A configuration of a learning data generation device 11 of Embodiment 1 will be described below with reference to FIG. 5. As illustrated in the figure, the learning data generation device 11 of the present embodiment includes a spinning rate acquisition unit 111, a contour initial value setting unit 112, a spinning rate estimation unit 113, a contour determination unit 114, a learning data output unit 115 and a learning data storage unit 116. An operation of each of the components will be described below with reference to FIG. 6.

<Spinning Rate Acquisition Unit 111>

The spinning rate acquisition unit 111 receives an input of a control signal for a start of processing, acquires a true value of a spinning rate of a spinning sphere (for example, a ball) recorded in a learning video image and outputs the true value to the contour determination unit 114 (S111). The true value of the spinning rate can be acquired from, e.g., another sensor.

<Contour Initial Value Setting Unit 112>

The contour initial value setting unit 112 receives an input of the learning video image in which motion of the spinning sphere is recorded, and based on the learning video image, estimates a size of a contour of the sphere recorded in the video image, according to an arbitrary method (for example, Mask R-CNN) and determines a result of the estimation as an initial value of the size of the contour, and outputs the learning video image and the initial value to the spinning rate estimation unit 113 (S112). For example, the contour of the sphere can be estimated, for example, by acquiring a region corresponding to the sphere region via segmentation of the image and performing circle fitting of the region to obtain a radius and a center of the circle. The sphere region can be obtained, for example, using the aforementioned function of Mask R-CNN.

<Spinning Rate Estimation Unit 113>

The spinning rate estimation unit 113 receives an input of the learning video image in which motion of the spinning sphere is recorded and the initial value of the size of the contour of the recorded sphere in the video image (estimated in step S112) and sets a plurality of set values of the size of the contour based on the initial value. The spinning rate estimation unit 113 obtains an estimated value of a spinning rate of the sphere based on the learning video image, for each of the set values (S113). For example, the spinning rate estimation unit 113, based on the initial value of the size of the contour estimated in step S112, sets a plurality of types of sizes (for example, radii) by varying the size (for example, a radius) at a constant rate, and estimates a spinning rate for each of the plurality of types of sizes that have been set. The spinning rate estimation unit 113 may set, for example, ±L % of the initial value as a maximum variation range, set sizes resulting from the maximum variation range being divided into N equal parts, that is, N+1 different sizes, and estimate a spinning rate for each of the set sizes. Note that a value of L is a value determined according to, e.g., an accuracy of segmentation of the learning video image and a blurriness of the contour of the sphere and is favorably around 20. Where the contour is so blurred that L needs to be set as no less than 20, the spinning rate of the ball may fail to be estimated from the learning video image. N is set to be an integer of no less than 2 to prevent a value resulting from division of the maximum variation range into N equal parts from being less than 1 (that is, less than 1 pixel).

Figure 7:
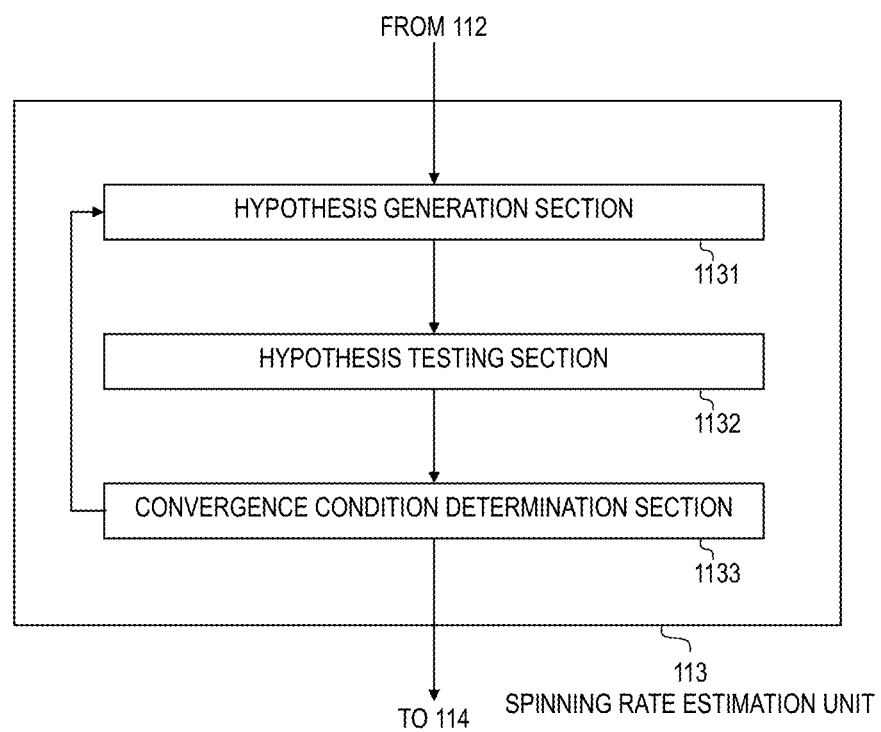
FIG. 7 is a block diagram illustrating a configuration of a spinning rate estimation unit of the learning data generation device of Embodiment 1.
Figure 8:
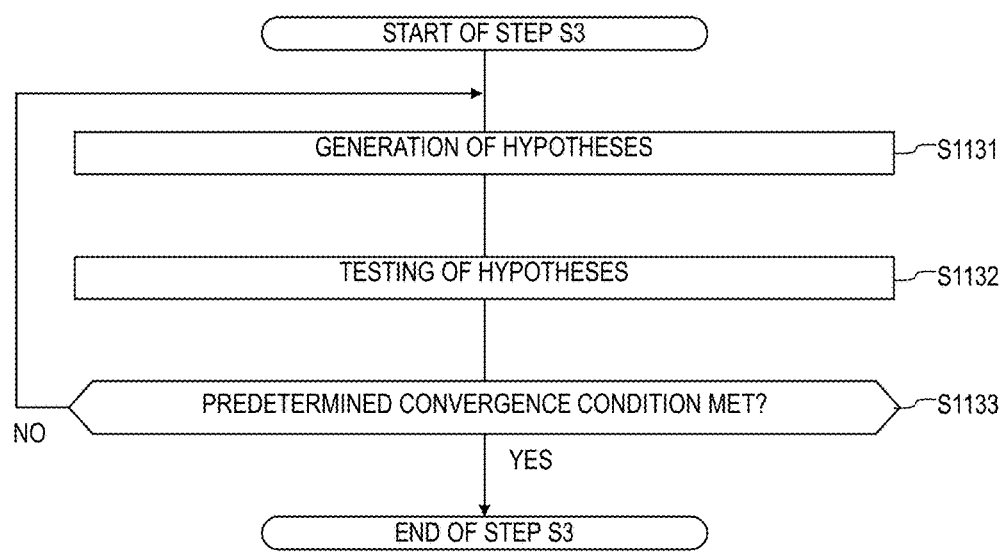
FIG. 8 is a flowchart illustrating an operation of the spinning rate estimation unit of the learning data generation device of Embodiment 1.

FIG. 7 illustrates a detailed configuration of the spinning rate estimation unit 113. As illustrated in the figure, the spinning rate estimation unit 113 includes a hypothesis generation section 1131, a hypothesis testing section 1132 and a convergence condition determination section 1133. Details of a spinning rate estimation operation of the spinning rate estimation unit 113 will be described below with reference to FIGS. 8 and 9.

<Details of Spinning Rate Estimation Operation>

As described above, the learning video image and the initial value are input to the spinning rate estimation unit 113.

The spinning rate estimation unit 113 estimates a spinning state of the sphere by, using the learning video image at a time t and the learning video image at a time t+tc, selecting, from among a plurality of hypotheses of the spinning state, a hypothesis of the spinning state, such that a likelihood of an image of the sphere resulting from the sphere in the learning video image at a certain time being spun for $t_c$ unit time based on the hypothesis of the spinning state is high (step S113).

In other words, the spinning rate estimation unit 113 estimates a spinning state of the sphere by selecting, from among a plurality of hypotheses of the spinning state, a hypothesis of the spinning state, such that an image of the sphere resulting from the sphere in the learning video image at a certain time being spun for $t_c$ unit time based on the hypothesis of the spinning state and the learning video image at a time $t_c$ unit time after the certain time are close to each other.

Symbol $t_c$ is a predetermined integer of no less than 1. For example, $t_c=1$. The integer $t_c$ may be smaller than an assumed spin period T of the sphere. As an example of the unit time, a time that passes in one frame is used. However, a time that passes in two frames can be used as the unit time.

For example, the spinning rate estimation unit 113 repeats the below-described processing in steps S1131, S1132 and S1133 until the estimated spinning state converges.

Step S1131 is processing for generating a plurality of hypotheses of the spinning state, which is performed by the hypothesis generation section 1131 of the spinning rate estimation unit 113.

Step S1132 is processing for evaluating the hypotheses, which is performed by the hypothesis testing section 1132 of the spinning rate estimation unit 113.

Step S1133 is processing for determining whether or not a convergence condition is met, which is performed by the convergence condition determination section 1133 of the spinning rate estimation unit 113.

In the below, the processing in steps S1131, S1132 and S1133 will be described taking an example in which the spinning state is estimated using the learning video image at the time t and the learning video image at the time $t+t_c$.

First, the hypothesis generation section 1131 of the spinning rate estimation unit 113 generates a plurality of hypotheses of the spinning state (step S1131). For example, the hypothesis generation section 1131 generates a plurality of hypotheses based on a probability distribution provided in advance. Note that in an initial state, generally, there is no prior information and the hypothesis generation section 1131 thus generates a plurality of hypotheses based on a uniform probability distribution.

Then, for each of the hypotheses of the spinning state, the hypothesis generation section 1131 generates an image of the sphere resulting from the sphere in the learning video image at the time t being spun for $t_c$ unit time based on the hypothesis.

Figure 9:
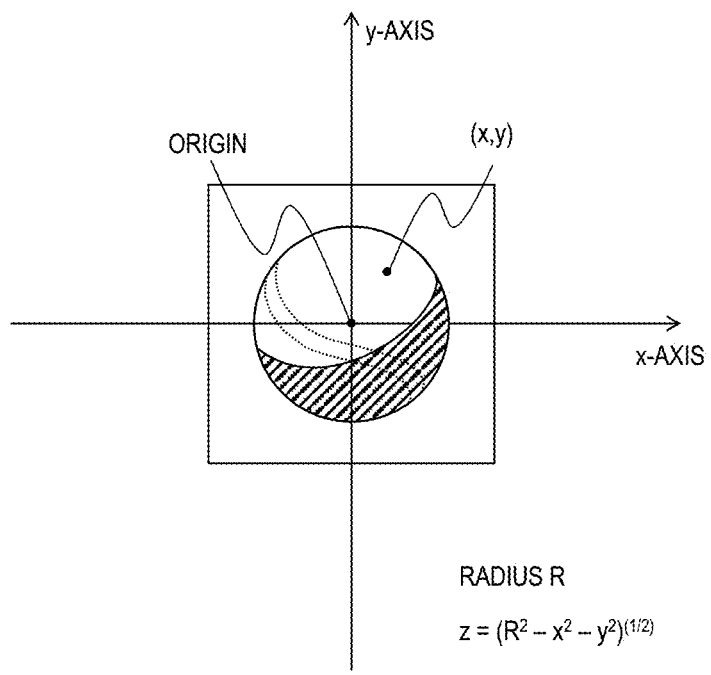
FIG. 9 is a diagram illustrating an operation of the spinning rate estimation unit of the learning data generation device of Embodiment 1.
Figures 10A, 10B, 10C:
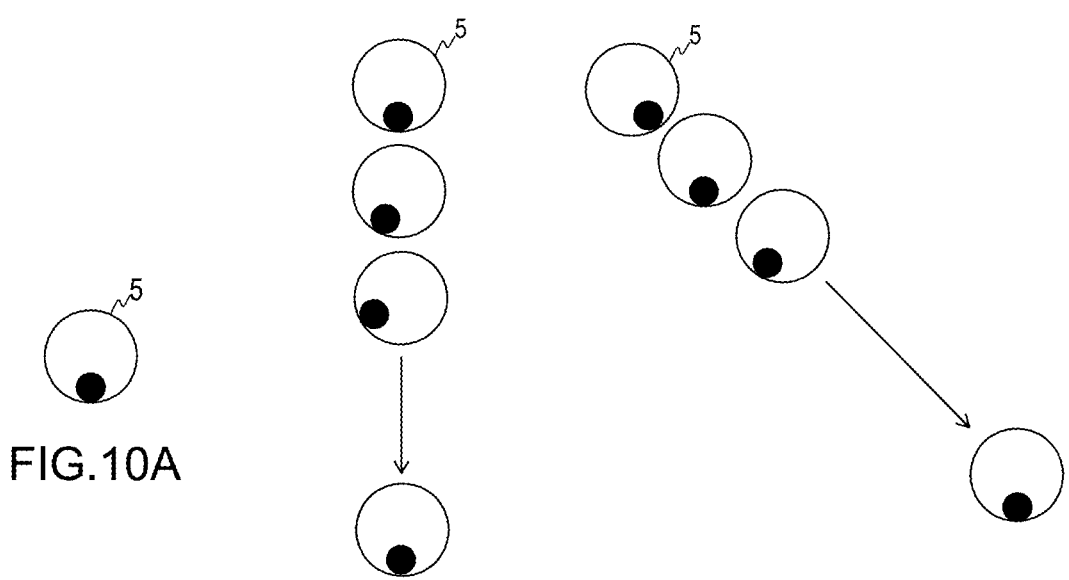
FIG. 10A is a diagram in which a pattern of a sphere 5 is simplified in an easy-to-understand manner.
FIG. 10B is a diagram illustrating the sphere 5 flying straight toward a camera 6.
FIG. 10C is a diagram illustrating the sphere 5 flying obliquely relative to the camera 6.

For example, it is assumed that: the sphere is a baseball; and a spherical half of the ball is shown in the learning video image. In this case, as illustrated in FIG. 9, where R is a radius of the ball, which is a sphere, and an origin is a center of the ball, a depth z at arbitrary coordinates (x, y) is $z=(R^2-x^2-y^2)^{(1/2)}$. Consequently, a three-dimensional position (x, y, z) of each pixel in the region of the ball can be obtained. Note that if an actual size of the sphere is known, a unit of an actual length may be used as a unit, or the number of pixels may be used as a unit.

The hypothesis generation section 1131 spins the three-dimensional position (x, y, z). For example, the three-dimensional position (x, y, z) can be spun using Rodrigues' spin formula. A spin matrix of clockwise spin by θ around a spinning axis ($n_x$, $n_y$, $n_z$) having a length of 1 can be defined as $$R_n(\theta) = \begin{bmatrix} \cos\theta + n_x^2(1-\cos\theta) & n_x n_y(1-\cos\theta) - n_z\sin\theta & n_x n_z(1-\cos\theta) + n_y\sin\theta \\ n_y n_x(1-\cos\theta) + n_z\sin\theta & \cos\theta + n_y^2(1-\cos\theta) & n_y n_z(1-\cos\theta) - n_x\sin\theta \\ n_z n_x(1-\cos\theta) - n_y\sin\theta & n_z n_y(1-\cos\theta) + n_x\sin\theta & \cos\theta + n_x^z(1-\cos\theta) \end{bmatrix},$$ [Math. 1]

according to Rodrigues' spin formula.

The hypothesis testing section 1132 of the spinning rate estimation unit 113 tests a likelihood of each of the hypotheses of the spinning state by comparing an image of the sphere resulting from the sphere in the learning video image at the time t being spun for $t_c$ unit time based on the hypothesis of the spinning state and the actual learning video image at the time $t+t_c$.

More specifically, the hypothesis testing section 1132 calculates a degree of similarity between the actual learning video image at the time $t+t_c$ and an image of the sphere resulting from the sphere in the learning video image at the time t being spun for $t_c$ unit time based on a certain hypothesis of the spinning state and determines the degree of similarity as a likelihood of the certain hypothesis (step S1132). Here, a degree of similarity between two images is, for example, a value of an output when a Euclidean distance between samples corresponding to each other in the two images is input to a predetermined non-increasing function. An example of the predetermined non-increasing function is $f(x)=1/x$. The hypothesis testing section 1132 performs the hypothesis likelihood calculation for each of the plurality of hypotheses generated in step S1131 (step S1132).

The convergence condition determination section 1133 of the spinning rate estimation unit 113 determines whether or not the calculated likelihoods of the hypotheses meet a predetermined convergence condition (step S1133). An example of the predetermined convergence condition is whether or not a magnitude of a difference between a maximum value of the hypothesis likelihoods calculated last time and a maximum value of the hypothesis likelihoods calculated this time is equal to or below a predetermined threshold value.

If the calculated hypothesis likelihoods meet the predetermined convergence condition, the convergence condition determination section 1133 selects, for example, a hypothesis corresponding to the maximum value of the hypothesis likelihoods calculated this time and outputs the spinning state in the selected hypothesis as a result of estimation of the spinning state of the sphere.

If the calculated hypothesis likelihoods do meet the predetermined convergence condition, the hypothesis generation section 1131 newly generates a plurality of hypotheses via random sampling based on a hypothesis probability distribution determined by the likelihoods calculated in step S1132 (step S1131).

In other words, the hypothesis generation section 1131 newly generates a plurality of hypotheses by repeating, a plurality of times, processing for determining a hypothesis from among the plurality of hypotheses generated this time in such a manner that a hypothesis based on which the likelihood calculated this time is higher is determined with a higher probability and determining a spinning state having a value obtained by addition of a random number to a value of the spinning state in the determined hypothesis, as a new hypothesis.

For example, N is the number of hypotheses generated this time and i (i=1, . . . , N) is a hypothesis. Where i=1, . . . , N, $x_i$ is a likelihood of a hypothesis i calculated this time. The spinning rate estimation unit 113 calculates a total sum of likelihoods $x_i$ of hypotheses i calculated this time, $S = \Sigma_{i=1}^{N} x_i$. Then, the spinning rate estimation unit 113 generates uniform random numbers x for a range [0, S]. Then, the spinning rate estimation unit 113 determines a hypothesis I satisfying a relationship of $(x - \Sigma_{i=1}^{I-1} x_i) > 0 \geq (x - \Sigma_{i=1}^{I} x_i)$. The spinning rate estimation unit 113 determines a spinning state having a value obtained by addition of random numbers to respective values of the spinning state in the hypothesis I, as a new hypothesis. For example, it is assumed that the spinning state of the hypothesis I is formed by a spinning axis $(r_x(I), r_y(I), r_z(I))$ and a spinning rate $\theta(I)$; and the random numbers are Gaussian noises $n_x$, $n_y$, $n_z$, $n_\theta$. In this case, the spinning state of the new hypothesis is $(r_x(I)+n_x, r_y(I)+n_y, r_z(I)+n_z, \theta(I)+n_\theta)$. The hypothesis generation section 1131 repeats this processing a plurality of times (for example, M times) to newly generate a plurality of hypotheses. M may be a value of, for example, around 10. It is desirable that this number of times be determined based on a trade-off relationship between processing time and accuracy. Generally, as the number of times is larger, the accuracy is enhanced more; however, the processing time becomes longer. First two or three times of the processing provide a large effect of accuracy enhancement and thus are highly recommended. Where there is no strict time pressure, M=around 10 can be considered favorable.

Subsequently, the hypothesis testing section 1132 performs the processing in step S1132 based on the plurality of hypotheses newly generated.

In this way, the spinning rate estimation unit 113 repeats the processing in steps S1131, S1132 and S1133 until the likelihoods of the calculated hypotheses meet the predetermined convergence condition.

As above, the spinning rate estimation unit 113 estimates a spinning state of a sphere by repeatedly performing processing for, for each of a plurality of hypotheses of the spinning state, calculating a likelihood of an image of the sphere resulting from the sphere in a learning video image at a time t being spun for $t_c$ unit time based on the hypothesis of the spinning state, and processing for newly generating a plurality of likely hypotheses of the spinning state based on the calculated likelihoods.

In the conventional technique, a video image corresponding to one period is needed in order to estimate a spinning state of a sphere. On the other hand, according to the above detailed operation, it is possible to estimate a spinning state of a sphere using a learning video image at a time t and the learning video image at a time $t+t_c$. Here, $t_c$ may be smaller than a period T. Therefore, according to the above detailed operation, it is possible to estimate a spinning state of a sphere even if a video image corresponding to one period is not obtained.

Note that factors of a change in appearance of a sphere include a change in position of the sphere in addition to a change in pose of the sphere. For example, as in FIG. 100, where a sphere flies obliquely relative to a camera, a change in position of the sphere is a factor of a change in appearance of the sphere. If $t_c$ is smaller than a period T, according to the above detailed operation, it is possible to estimate a spinning state of a sphere using images, such that a time interval between the images is shorter than that of the conventional technique, and thus, it is possible to reduce an effect of a change in appearance of the sphere due to a change in position of the sphere. Therefore, e.g., even where a sphere flies obliquely relative to a camera as in FIG. 100, it is possible to estimate a spinning state of the sphere with an accuracy that is higher than that of the conventional technique, according to the above detailed operation.

[Alterations]

<Alteration 1>

The spinning rate estimation unit 113 may generate a feature-enhanced learning video image in which a feature of a sphere is enhanced, using a learning video image.

For example, the spinning rate estimation unit 113 generates a feature-enhanced learning video image by performing edge extraction of a learning video image. Consequently, the feature of the sphere can be enhanced.

Figure 11A:
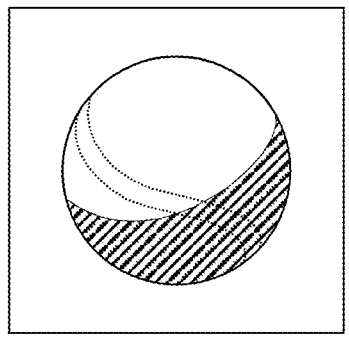
FIG. 11A is a diagram illustrating that when a sphere changes in position, a shadow on the sphere changes according to a lighting environment.
Figure 11B:
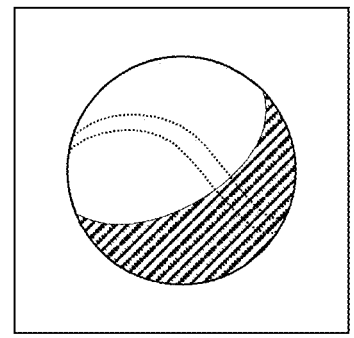
FIG. 11B is a diagram illustrating that when a sphere changes in position, a shadow on the sphere changes according to a lighting environment.

In many cases, a baseball, which is an example of the sphere, is provided with a mark and has a seam. Also, as illustrated in FIGS. 11(a) and 11(b), when a sphere changes in position, a shadow on the sphere may change according to a lighting environment.

The spinning rate estimation unit 113 can clarify an appearance of the sphere by performing processing for feature enhancement, for example, edge processing and thereby minimizing an effect of the lighting environment. More specifically, the seam of the ball can easily be recognized.

In this case, the spinning rate estimation unit 113 performs the processing in steps S1131 to S1133 and later-described processing in Alterations 2 to 4, using the feature-enhanced learning video image instead of the learning video image. In other words, the learning video image used by the spinning rate estimation unit 113 in order to estimate a spinning state may be a feature-enhanced learning video image.

The spinning rate estimation unit 113 has an advantage of enhancement in accuracy of spinning rate estimation processing by performing processing for enhancing a feature of a sphere.

<Alteration 2>

In step S1132, the spinning rate estimation unit 113 may calculate likelihoods of hypotheses in consideration of only a predetermined area in two images. For example, the spinning rate estimation unit 113 may calculate likelihoods of hypotheses using a method in which for each of pixels included in an area, in which the sphere is displayed, of the learning video image, a direction normal to the sphere at a position of the pixel is calculated and only pixels in a direction toward a camera are used, or using a method in which only pixels located on the camera side relative to a predetermined threshold value is used by using positions in a depth direction relative to an image plane of the camera.

<Alteration 3>

The above-described technique is a technique that can be implemented using learning video images corresponding to two frames at a time t and a time $t+t_c$.

On the other hand, an estimation based on likelihoods may be performed over a plurality of frames. In other words, the spinning rate estimation unit 113 may estimate a spinning state of a sphere by, using learning video images at times $t_1, t_2, \ldots, t_K$ and learning video images at times $t_1+t_c, t_2+t_c, \ldots, t_K+t_c$, selecting, from among a plurality of hypotheses of the spinning state, a hypothesis of the spinning state, such that a likelihood of an image of the sphere resulting from the sphere in the learning video images at the times $t_1, t_2, \ldots, t_K$ being spun for $t_c$ unit time based on the hypothesis of the spinning state is high.

Note that where an image of a baseball, a maximum value of a spinning rate of which is around 2800, is shot at 960 fps, empirically, an accuracy in estimation of a spinning state is stabilized at around k=10.

If a feature of an appearance of the sphere is small, only consideration of learning video images corresponding to two frames at a time t and a time $t+t_c$ may be insufficient for proper estimation of the spinning state of the sphere. This is because where a feature of an appearance of the sphere is small, a change in appearance of the sphere due to a change in pose of the sphere is also small.

Figure 12A:
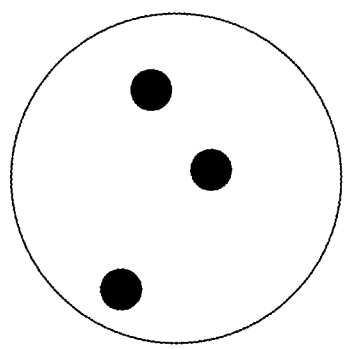
FIG. 12A is a diagram illustrating an example of texture of the sphere.
Figure 13A:
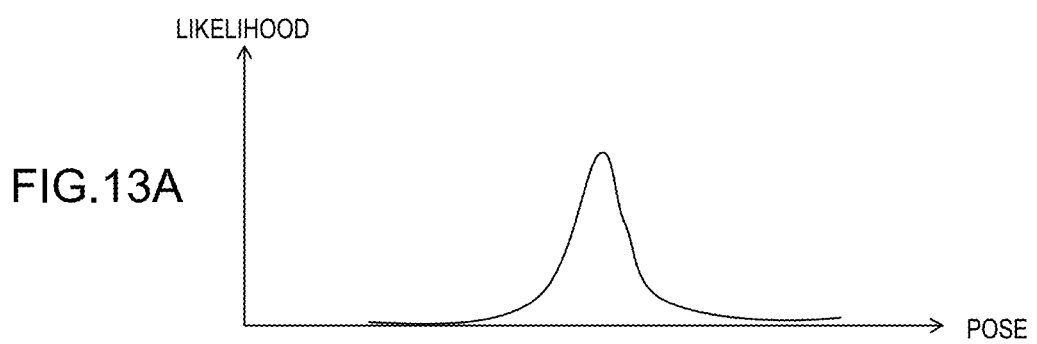
FIG. 13A is a diagram indicating that a width of a likelihood distribution varies depending on the texture of the sphere.

For example, where the sphere has the texture in FIG. 12A, it is easy to determine corresponding points (in this example, three corresponding points) in the image at the time t and the image at the time $t+t_c$. In this case, it is expected that the likelihood distribution in FIG. 13A is obtained by likelihood calculation using spin during time between the times t and $t+t_c$. In FIG. 13A, the abscissa axis represents the pose and the ordinate axis represents the likelihood. In this way, in a case where designation of corresponding points is easy, a width of a likelihood distribution is small.

Figure 12B:
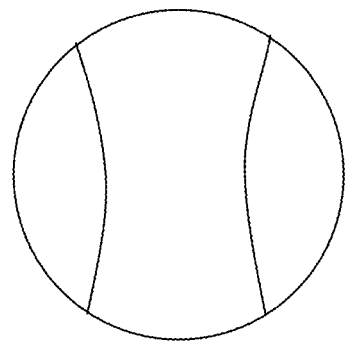
FIG. 12B is a diagram illustrating an example of texture of the sphere.
Figure 13B:
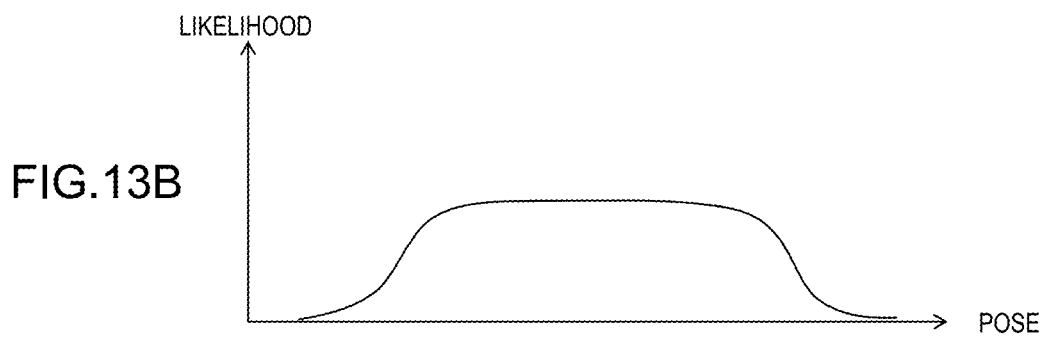
FIG. 13B is a diagram indicating that a width of a likelihood distribution varies depending on the texture of the sphere.

On the other hand, for example, where the sphere has the texture in FIG. 12B, if the sphere spins in a vertical direction (spins with a right-left direction (horizontal direction) in FIG. 12B as an axis), determination of corresponding points is difficult. In this case, it is expected that the likelihood distribution in FIG. 13B is obtained by likelihood calculation using spin during time between the times t and $t+t_c$. In FIG. 13A, the abscissa axis represents the pose and the ordinate axis represents the likelihood. In this way, in a case where designation of corresponding points is difficult, a width of a likelihood distribution is large.

In the case of FIGS. 12(*b*) and 13(*b*), the learning video image is formed of edge components extending in the vertical direction in the image, and thus, a change in likelihood according to an amount of spin is small. Therefore, use of one set of frames becomes a major factor of an accuracy decrease.

Figure 14:
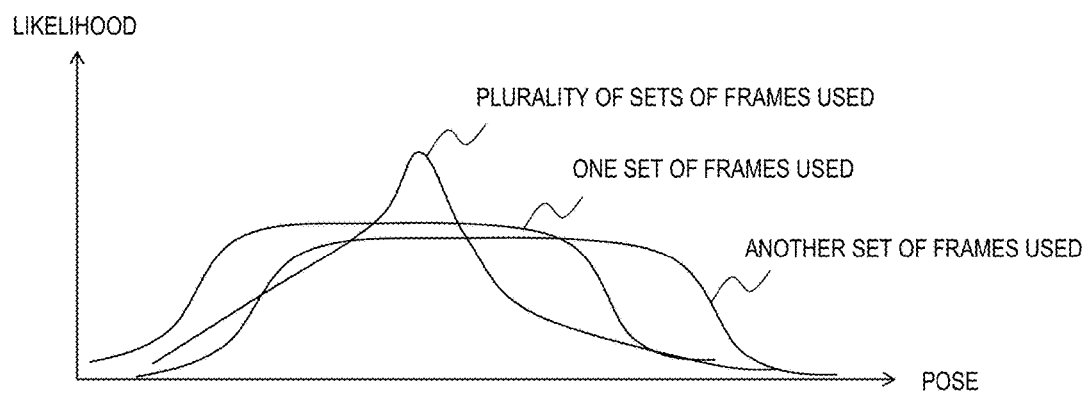
FIG. 14 is a diagram indicating that where a plurality of frames are used, a width of a likelihood distribution becomes narrow.

On the other hand, use of a plurality of sets of frames is expected to produce the distribution in FIG. 14. In other words, although a width of a likelihood distribution relative to a pose is large for each of the sets of frames, it is conceivable that consideration of the plurality of sets of frames narrows the width of the likelihood distribution and thus enables more proper estimation of the pose.

Alteration 3 is effective where a sphere is an object in which only a seam that smoothly changes can be seen as a feature, such as a baseball.

<Alteration 4>

In the repeated processing in step S1132, the spinning rate estimation unit 113 may make a value of $t_c$ used in the processing in step S1132 of last time and a value of $t_c$ used in the processing in step S1132 of this time different from each other.

For example, the spinning rate estimation unit 113 may perform processing with $t_c=1$ in processing in step S1132 of first N times and perform processing with $t_c=2$ in processing in step S32 of subsequent times.

Consequently, an amount of change in value of the spinning state in each of the generated hypotheses becomes large, enabling stable estimation of the spinning state.

<Alteration 5>

The spinning axis in the spinning state estimated by the above detailed operation is a spinning axis in a camera coordinate system and thus changes according to a position and a pose of the camera. Therefore, where the sphere is a baseball, a spinning axis of the ball in a coordinate system of a baseball ground may be obtained by estimating the position and the pose of the camera and performing calibration in advance.

Where the sphere is a baseball, for example, the below processing in steps (a) to (f) may be performed.

(a) Bring the camera into a state in which an angle of shooting is widest.

(b) In such a state, estimate intrinsic parameters of the camera. The intrinsic parameters of the camera include, e.g., a distortion of a lens of the camera and can be obtained by, e.g., the method in Reference Patent Literature 1.

[Reference Patent Literature 1] Zhengyou Zhang, "A Flexible New Technique for Camera Calibration", IEEE Transactions on Pattern Analysis and Machine Intelligence, 22(11): 1330-1334, 2000.

Reference Non-Patent Literature 2 includes details on intrinsic parameters of a camera.

[Reference Non-Patent Literature 2] Ryo Komiyama, "Intrinsic Parameters, Extrinsic Parameters and Distortion of Camera, for Review", [online], [Searched on Mar. 14, 2019], Internet <URL: https://qiita.com/ryokomy/items/fee2105c3e9bfccde3a3>

(c) Shoot an image in such a manner that a home base, first to third bases and a pitcher's plate can be observed from a shooting position.

(d) Obtain a position and a pose of the camera in the coordinate system of the baseball ground by solving a PNP (perspective n-point problem) using the home base and the first to third bases, respective positions of which are known in the baseball ground. Reference Non-Patent Literature 3 includes details on the PNP. In Reference Non-Patent Literature 3, it is assumed that a solution of a P3P is obtained.

[Reference Non-Patent Literature 3] "Camera Position and Pose Estimation 2 PNP Problem Theory Section", [online], [searched on Mar. 14, 2019], Internet <URL: http://daily-tech.hatenablog.com/entry/2018/01/21/185633>

(e) As necessary, perform zooming, acquire a ball image via the above detailed operation and obtain the spinning axis of the ball in the camera coordinate system.

(f) The spinning axis of the ball in the coordinate system of the baseball ground can be obtained from the spinning axis obtained in step (e) and the pose of the camera obtained in step (d).

Although the detailed operation of the spinning rate estimation unit 113 and alterations thereof have been described above, it should be understood that: the specific configuration is not limited to these operation and alterations; and the present invention includes any appropriate design changes, etc., without departing from the spirit of the present invention.

For example, the above alterations may appropriately be combined.

Also, data may be transmitted/received among the component units of the spinning rate estimation unit directly or via a non-illustrated storage unit.

<Contour Determination Unit 114>

The contour determination unit 114 receives an input of the true value of the spinning rate of the sphere, the true value being obtained in advance for the learning video image, and determines a set value corresponding to an estimated value closest to the true value, as a determined value of the contour (S114). The contour determination unit 114 may determine at least any of a plurality of set values corresponding to a plurality of estimated values selected in order of closeness to the true value, as a determined value of the contour. The below description will be provided on the assumption that a set value corresponding to an estimated value closest to the true value is determined as a determined value of the contour, as an example. The contour determination unit 114 may perform, e.g., weighted averaging using reciprocals of respective errors from the true value as weights. The weighted averaging may be performed for all of the N+1 different radii set in step S113 or may be performed for a plurality of radii selected from the N+1 different radii.

<Learning Data Output Unit 115>

The learning data output unit 115 receives an input of the learning video image and the determined value set in the contour determination unit 114, the determined value corresponding to the estimated value closest to the true value of the spinning rate of the sphere, the true value being obtained in advance for the learning video image, and associates the determined value with the relevant learning video image and outputs the determined value and the learning video image as learning data (S115).

<Learning Data Storage Unit 116>

The learning data storage unit 116 stores the learning data (S116).

In this way, the learning data generation device 11 of the present embodiment enables generating learning data for learning a recognizer capable of estimating a contour of a sphere making spinning motion, with high accuracy, the sphere being recorded in a single camera video image.

[Learning Device 12]

Figure 15:
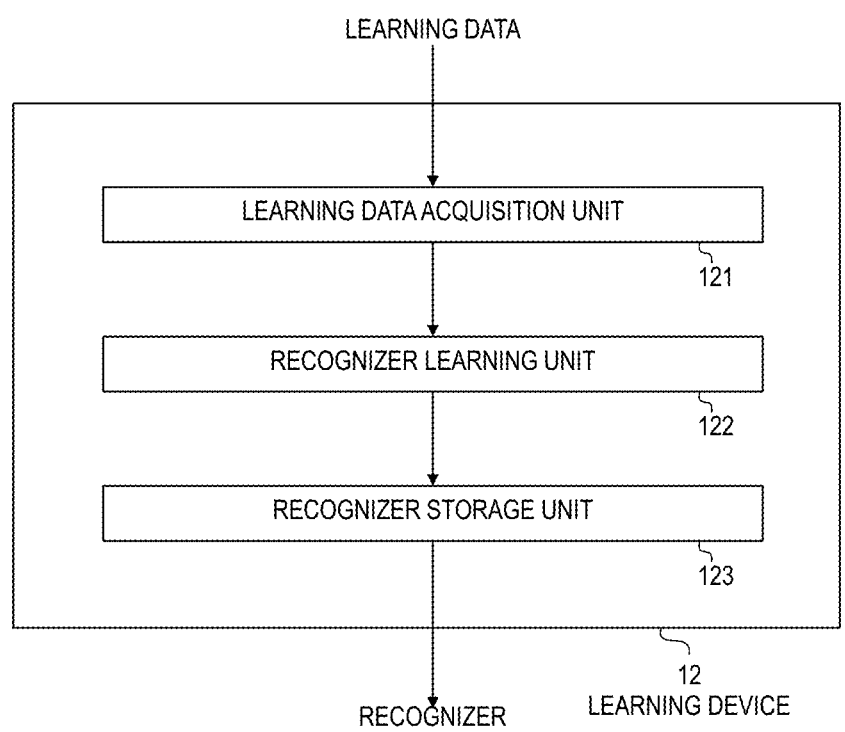
FIG. 15 is a block diagram illustrating a configuration of a learning device of Embodiment 1.
Figure 16:
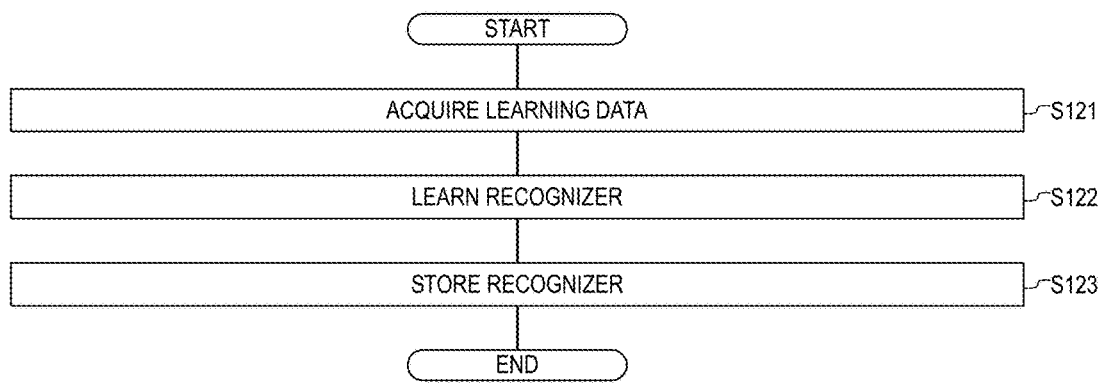
FIG. 16 is a flowchart illustrating an operation of the learning device of Embodiment 1.

A learning device 12 that uses learning data generated by the learning data generation device 1 will be described below with reference to FIG. 15. As illustrated in the figure, the learning device 12 of the present embodiment includes a learning data acquisition unit 121, a recognizer learning unit 122 and a recognizer storage unit 123. An operation of each of the components will be described below with reference to FIG. 16.

<Learning Data Acquisition Unit 121>

The learning data acquisition unit 121 acquires a set (a plurality of sets as the case may be) of a learning video image and a determined value that form learning data, from the learning data generation device 1 and outputs the set of a learning video image and a determined value to the recognizer learning unit 122 (S121).

<Recognizer Learning Unit 122>

The recognizer learning unit 122 acquires the set (plurality of sets as the case may be) of a learning video image and a determined value that form the learning data, and based on the learning data, learns a recognizer that estimates a contour of a sphere in a video image and outputs the learned recognizer to the recognizer storage unit 123 (S122). An example of a method for learning a recognizer that estimates a contour of a sphere is segmentation using SVM. In this method, learning for performing binary classification regarding whether or not an attention pixel p is included in a sphere region is performed using an input of information of M×M pixels neighboring the attention pixel p. At this time, it is preferable that M be set in such a manner as to include the entire sphere region, that is, certainly include the sphere region and a region that is not the sphere region. For example, it is preferable that M be set to around 1.5 times the initial value set in step S112. Also, determination of a square region as the neighboring M×M pixels is a mere example. For example, learning for performing binary classification regarding whether or not an attention pixel p is included in the sphere region may be performed using an input of information of M×Q pixels neighboring the attention pixel p where M≠Q.

<Recognizer Storage Unit 123>

The recognizer storage unit 123 stores the recognizer (S123).

[Recognition Device 13]

Figure 17:
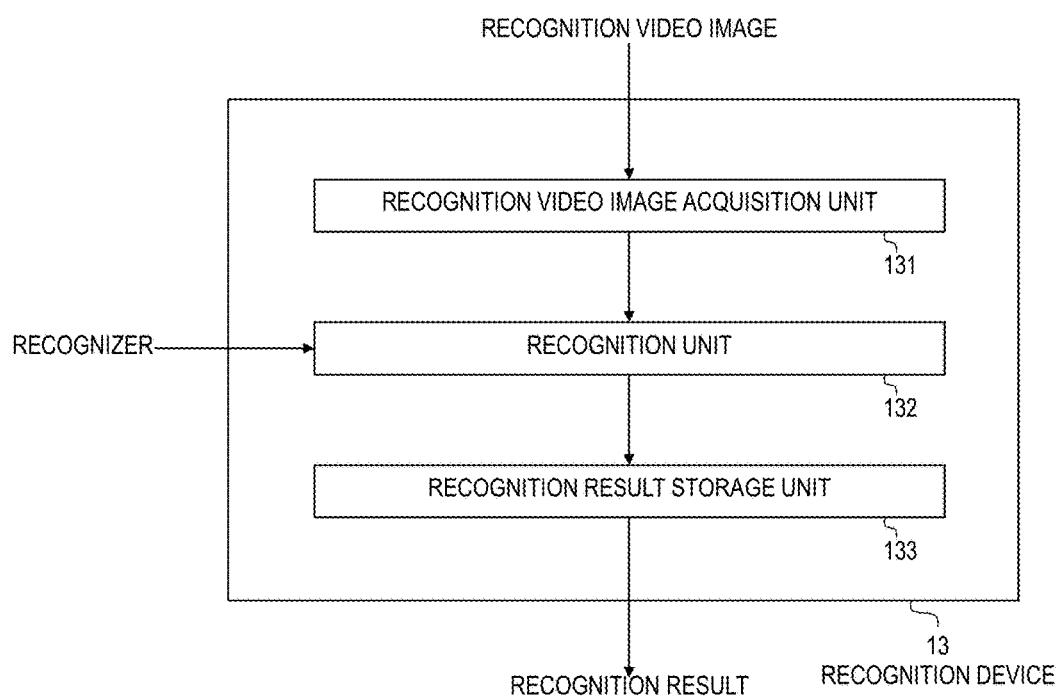
FIG. 17 is a block diagram illustrating a configuration of a recognition device of Embodiment 1.
Figure 18:
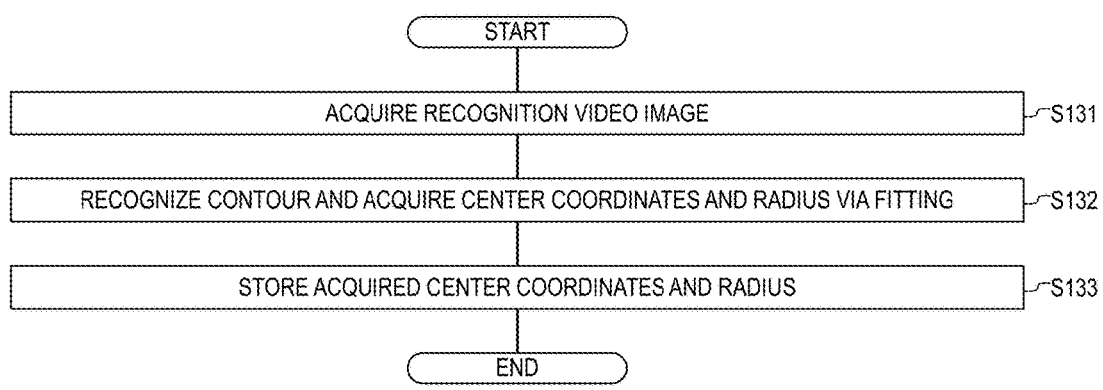
FIG. 18 is a flowchart illustrating an operation of the recognition device of Embodiment 1.

The recognition device 13 that uses the recognizer learned by the learning device 12 will be described below with reference to FIG. 17. As illustrated in the figure, the recognition device 13 of the present embodiment includes a recognition video image acquisition unit 131, a recognition unit 132 and a recognition result storage unit 133. An operation of each of the components will be described below with reference to FIG. 18.

<Recognition Video Image Acquisition Unit 131>

The recognition video image acquisition unit 131 acquires a video image for recognition (recognition video image) in which a contour of a recorded sphere is unknown and outputs the recognition video image to the recognition unit 132 (S131).

<Recognition Unit 132>

The recognition unit 132 acquires the recognizer learned by the learning device 12, recognizes the contour of the sphere from the recognition video image, using the recognizer and acquires a result of the recognition, and outputs the acquired recognition result to the recognition result storage unit 133 (S132). For example, where the sphere is a ball, the recognition unit 132 recognizes the contour using the recognizer learned by the learning device 12. Furthermore, the recognition unit 132 may perform circle fitting of the recognized contour to acquire center coordinates and a radius of the contour as the recognition result. Where the sphere is a ball and processing performed using the contour is based on the premise that the ball is a perfect circle, it is desirable to determine the center coordinates and the radius of the contour acquired by performing circle fitting of the contour as the recognition result as above. However, what recognition result is desirable differs depending on processing performed using the contour. The recognized ball region, an image of the contour or information of, e.g., a coordinate value itself may be output as the recognition result, or the center coordinates and the radius of the contour may be acquired and output as the recognition result.

<Supplement>

A device of the present invention, for example, as a single hardware entity, includes an input unit to which, e.g., a keyboard is connectable, an output unit to which, e.g., a liquid-crystal display is connectable, a communication unit to which a communication device (for example, a communication cable) that enables communication with the outside of the hardware entity is connectable, a CPU (central processing unit, which may include, e.g., a cache memory and a register), a RAM and a ROM, each of which is a memory, and an external storage device, which is a hard disk, and a bus connecting the input unit, the output unit, the communication unit, the CPU, the RAM, the ROM and the external storage device in such a manner that data can be transmitted/received among these units, the memories and the device. Also, as necessary, e.g., a device (drive) capable of reading/writing from/to a recording medium such as a CD-ROM may be provided in the hardware entity. Examples of a physical entity including these hardware resources include, e.g., a general-purpose computer.

In the external storage device of the hardware entity, e.g., a program necessary for implementation of the above-described functions and data necessary for processing of the program are stored (not only in the external storage device, but also, for example, the program may be stored in the ROM, which is a read-only storage device). Also, data, etc., obtained as a result of processing of the program are appropriately stored in, e.g., the RAM or the external storage device.

In the hardware entity, the program and data necessary for processing of the program that are stored in the external storage device (or, e.g., the ROM) are read into a memory as necessary and appropriately interpreted and executed or processed by the CPU. As a result, the CPU implements predetermined functions (respective components each referred to as, e.g., " . . . unit" or " . . . means" above).

The present invention is not limited to the above-described embodiment and appropriate changes are possible without departing from the spirit of the present invention. Also, the processing steps described in the above embodiment may be performed not only chronologically according to the order in which the processing steps are described, but also in parallel or individually according to a processing capacity of the device that performs the processing steps or as necessary.

As already described, where the processing functions in the hardware entity (device of the present invention) described in the present embodiment are implemented by a computer, the contents of processing by the functions that the hardware entity should have are described by a program. Then, upon execution of the program by the computer, the processing functions in the hardware entity are implemented in the computer.

Figure 19:
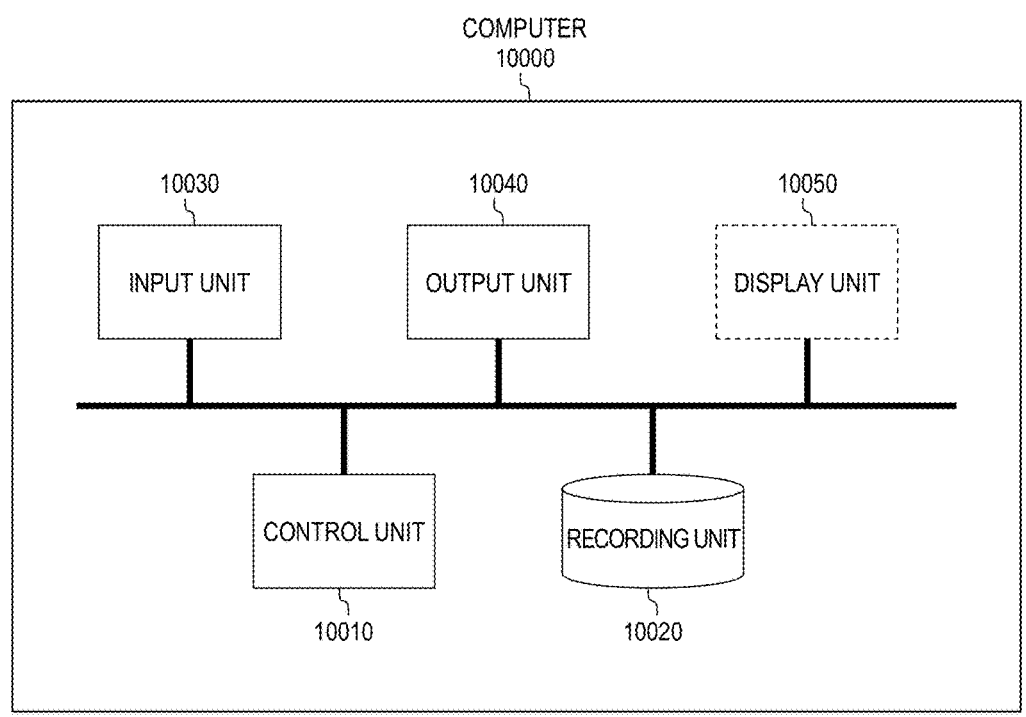
FIG. 19 is a diagram illustrating an example functional configuration of a computer.

Various processing steps described above can be performed by making a recording unit 10020 of the computer illustrated in FIG. 19 read a program for performing the respective steps of the above-described method and making, e.g., a control unit 10010, an input unit 10030 and an output unit 10040 operate.

The program that describes the respective processing contents can be recorded on a computer-readable recording medium in advance. The computer-readable recording medium may be any one, for example, a magnetic recording device, an optical disk, a magneto-optical recording medium or a semiconductor memory. More specifically, for example, as a magnetic recording device, e.g., a hard disk device, a flexible disk or a magnetic tape can be used, as an optical dick, e.g., a DVD (digital versatile disc), a DVD-RAM (random access memory), a CD-ROM (compact disc read-only memory), a CD-R (recordable)/RW (rewritable) can be used, as a magneto-optical recording medium, e.g., an MO (magneto-optical disc) can be used, and as a semiconductor memory, e.g., an EEP-ROM (electrically erasable and programmable-read only memory) can be used.

Also, distribution of the program is conducted, for example, by, e.g., sale, transfer or lease of a removable recording medium such as a DVD or a CD-ROM with the program recorded thereon. Furthermore, the program may be distributed by storing the program in a storage device of a server computer in advance and transferring the program from the server computer to another computer via a network.

A computer that executes such a program, for example, first, stores the program recorded on the removable recording medium or the program transferred from the server computer in its own storage device once. Then, at the time of performing processing, the computer reads the program stored in its own recording medium and performs processing according to the read program. Also, as another form of execution of the program, the computer may read the program directly from the removable recording medium and perform processing according to the program, or each time the program is transferred from the server computer to the computer, the computer may sequentially perform processing according to the received program. Also, the above-described processing may be performed by what is called an ASP (application service provider)-type service in which the processing functions are implemented only by an instruction for execution of the program and acquisition of a result of the execution without transfer of the program from the server computer to the computer. Note that the program in the present form includes information provided for processing by a computer, the information being equivalent to a program (e.g., data that is not a direct instruction to a computer but has a nature of defining processing in the computer).

Also, in this form, the hardware entity is configured by execution of a predetermined program on a computer; however, at least a part of the processing contents may be implemented by hardware.

The invention claimed is:

1. A learning data generation device comprising:
   processing circuitry configured to
   receive an input of a learning video image in which motion of a spinning sphere is recorded and an initial value of a size of a contour of the recorded sphere in the video image, set a plurality of set values of the size of the contour based on the initial value, and obtain an estimated value of a spinning rate of the sphere based on the learning video image, for each of the set values;
   receive an input of a true value of the spinning rate of the sphere, the true value being obtained in advance for the learning video image, and determine at least one of a plurality of the set values respectively corresponding to a plurality of the estimated values selected in order of closeness to the true value, as a determined value of the contour; and
   output the learning video image and the determined value as learning data.

2. The learning data generation device according to claim 1, wherein
   the processing circuitry estimates a spinning state of the sphere by, using the learning video image at a time t and the learning video image at a time $t+t_c$ where $t_c$ is a predetermined integer of no less than 1, selecting, from among a plurality of hypotheses of the spinning state, a hypothesis of the spinning state, such that a likelihood of an image of the sphere resulting from the sphere in the learning video image at a certain time being spun for $t_c$ unit time based on the hypothesis of the spinning state is high.

3. The learning data generation device according to claim 2, wherein
   the processing circuitry estimates the spinning state of the sphere by, using the learning video images at times $t_1, t_2, \ldots, t_K$ and the learning video images at times $t_1+t_c, t_2+t_c, \ldots, t_K+t_c$, selecting, from among a plurality of hypotheses of the spinning state, a hypothesis of the spinning state, such that a likelihood of an image of the sphere resulting from the sphere in the learning video images at the times $t_1, t_2, \ldots, t_K$ being spun for $t_c$ unit time based on the hypothesis of the spinning state is high.

4. The learning data generation device according to claim 2, wherein the processing circuitry repeatedly perform processing for, for each of the plurality of hypotheses of the spinning state, calculating a likelihood of an image of the sphere resulting from the sphere in the learning video image at the time t or the learning video images at the times $t_1, t_2, \ldots, t_K$ being spun for $t_c$ unit time based on the hypothesis of the spinning state, and processing for newly generating a plurality of likely hypotheses of the spinning state based on the calculated likelihoods.

5. The learning data generation device according to claim 4, wherein the processing for newly generating a plurality of likely hypotheses of the spinning state based on the calculated likelihoods, the processing being performed by the processing circuitry, is processing for newly generating a plurality of hypotheses by repeating, a plurality of times, processing for determining a hypothesis, from among the plurality of hypotheses of the spinning state, in such a manner that a hypothesis, based on which the calculated likelihood of the hypothesis is higher, is determined with a higher probability and determining a spinning state having a value obtained by addition of a random number to a value of the spinning state in the determined hypothesis, as a new hypothesis.

6. A learning data generation method comprising:
a step of receiving an input of a learning video image in which motion of a spinning sphere is recorded and an initial value of a size of a contour of the recorded sphere in the video image, setting a plurality of set values of the size of the contour based on the initial value, and obtaining an estimated value of a spinning rate of the sphere based on the learning video image, for each of the set values;
a step of receiving an input of a true value of the spinning rate of the sphere, the true value being obtained in advance for the learning video image, and determining at least one of a plurality of the set values respectively corresponding to a plurality of the estimated values selected in order of closeness to the true value, as a determined value of the contour; and
a learning data step of outputting the learning video image and the determined value as learning data.

7. A non-transitory computer readable medium that stores a program that causes a computer to function as the learning data generation device according to claim 1.

8. A non-transitory computer readable medium that stores a program that causes a computer to function as the learning data generation device according to claim 2.

9. A non-transitory computer readable medium that stores a program that causes a computer to function as the learning data generation device according to claim 3.

10. A non-transitory computer readable medium that stores a program that causes a computer to function as the learning data generation device according to claim 4.

11. A non-transitory computer readable medium that stores a program that causes a computer to function as the learning data generation device according to claim 5.

* * * * *